US010692102B2

(12) United States Patent
Vierra

(10) Patent No.: US 10,692,102 B2
(45) Date of Patent: Jun. 23, 2020

(54) PRICE MINING AND PRODUCT RE-PRICING DATA PROCESSING SYSTEMS AND METHODS

(71) Applicant: Viesoft, Inc., Walnut Creek, CA (US)

(72) Inventor: Anthony Vierra, Walnut Creek, CA (US)

(73) Assignee: Viesoft, Inc., Walnut Creek, CA (US)

( * ) Notice: Subject to any disclaimer, the term of this patent is extended or adjusted under 35 U.S.C. 154(b) by 0 days.

(21) Appl. No.: 16/542,566

(22) Filed: Aug. 16, 2019

(65) Prior Publication Data

US 2019/0370838 A1 Dec. 5, 2019

Related U.S. Application Data

(63) Continuation-in-part of application No. 15/379,137, filed on Dec. 14, 2016, now Pat. No. 10,389,752.
(Continued)

(51) Int. Cl.
*G06F 21/00* (2013.01)
*G06Q 30/02* (2012.01)

(52) U.S. Cl.
CPC ............... *G06Q 30/0206* (2013.01)

(58) Field of Classification Search
None
See application file for complete search history.

(56) References Cited

U.S. PATENT DOCUMENTS 5,873,069 A * 2/1999 Reuhl ............... G06Q 20/201
235/375
6,460,022 B1 10/2002 Plotkin
(Continued)

FOREIGN PATENT DOCUMENTS

EP 0973112 1/2000

OTHER PUBLICATIONS

Apgar, S., & Writer, S. (Nov. 30, 1991). Metro retailers kick off holiday shopping season with all-out bargain blitz. Star Tribune Retrieved from http://search.proquest.com/docview/418334202?accountid=14753.
(Continued)

*Primary Examiner* — William J. Goodchild
(74) *Attorney, Agent, or Firm* — Brient IP Law, LLC

(57) ABSTRACT

Price mining and product re-pricing data processing systems and methods are disclosed. A computer system is configured for displaying (e.g., on an electronic display associated with a particular product in a brick-and-mortar store) a first price for the particular product. The system monitors one or more competitor websites for competing prices, adjusts the first price to a second price if the competitor's pricing for the particular product differs from the first price and updates the first price to the second price on the electronic display. In various embodiments, adjusting the first price to the second price occurs substantially automatically. In some embodiments, the system tracks price change trends of competitors for one or more products and determines a predicted price change prior to an actual competitor price change. In some embodiments, the system changes one of the first price or the second price to the predicted price prior to an actual price change by the competitor.

20 Claims, 8 Drawing Sheets

Related U.S. Application Data which is a continuation-in-part of application No. 14/597,029, filed on Jan. 14, 2015, now Pat. No. 9,552,487, which is a continuation-in-part of application No. 14/586,201, filed on Dec. 30, 2014.

(60) Provisional application No. 61/922,622, filed on Dec. 31, 2013.

(56) References Cited

U.S. PATENT DOCUMENTS

| | | | |
|---|---|---|---|
| 6,749,116 | B2 | 6/2004 | Massaro |
| 6,938,170 | B1 | 8/2005 | Kraft et al. |
| 7,421,645 | B2 | 9/2008 | Reynar |
| 7,685,271 | B1 | 3/2010 | Schneider et al. |
| 7,752,072 | B2 | 7/2010 | Barry et al. |
| 7,752,190 | B2 | 7/2010 | Skinner |
| 7,778,919 | B2 | 8/2010 | Waelbroeck et al. |
| 7,912,755 | B2 | 3/2011 | Perry et al. |
| 7,958,005 | B2 | 6/2011 | Dangaltchev |
| 8,036,937 | B2 | 10/2011 | Tang et al. |
| 8,050,976 | B2 | 11/2011 | Staib et al. |
| 8,091,031 | B2* | 1/2012 | Evans .................. G06Q 30/02 705/14.72 |
| 8,239,282 | B2 | 8/2012 | Tuflija et al. |
| 8,249,885 | B2 | 8/2012 | Berkowitz et al. |
| 8,346,536 | B2 | 1/2013 | Jiang et al. |
| 8,438,072 | B2 | 5/2013 | Fusz et al. |
| 8,522,270 | B2 | 8/2013 | Chatter et al. |
| 8,548,872 | B1 | 10/2013 | Gupta et al. |
| 8,577,734 | B2* | 11/2013 | Treyz .................. G06Q 20/12 705/26.1 |
| 8,583,483 | B2 | 11/2013 | Patwa et al. |
| 8,589,694 | B2 | 11/2013 | Clark et al. |
| 8,719,082 | B1 | 5/2014 | Snyder et al. |
| 8,996,403 | B2 | 3/2015 | Tang et al. |
| 9,037,504 | B2 | 5/2015 | Nair |
| 9,202,229 | B2 | 12/2015 | Junger |
| 9,311,662 | B2 | 4/2016 | Skinner |
| 9,390,140 | B2 | 7/2016 | Huang et al. |
| 9,413,786 | B1 | 8/2016 | Boss et al. |
| 9,594,732 | B2 | 3/2017 | Compain et al. |
| 2001/0047308 | A1 | 11/2001 | Kaminsky et al. |
| 2002/0072984 | A1 | 6/2002 | Rothman et al. |
| 2003/0110400 | A1 | 6/2003 | Cartmell et al. |
| 2007/0239560 | A1 | 10/2007 | McGuire et al. |
| 2008/0201214 | A1 | 8/2008 | Aaron et al. |
| 2009/0254455 | A1 | 10/2009 | Rothey et al. |
| 2010/0094673 | A1 | 4/2010 | Lobo et al. |
| 2010/0169194 | A1 | 7/2010 | Richey et al. |
| 2010/0251366 | A1 | 9/2010 | Baldry |
| 2010/0262688 | A1 | 10/2010 | Hussain et al. |
| 2011/0029781 | A1 | 2/2011 | Clark et al. |
| 2011/0270969 | A1 | 11/2011 | Noh et al. |
| 2011/0288928 | A1* | 11/2011 | Patwa ................ G06Q 30/0256 705/14.42 |
| 2012/0046998 | A1 | 2/2012 | Staib et al. |
| 2012/0173326 | A1 | 7/2012 | Tao et al. |
| 2012/0221485 | A1 | 8/2012 | Leidner et al. |
| 2012/0226558 | A1 | 9/2012 | Robyor |
| 2012/0303412 | A1* | 11/2012 | Etzioni .................. G06Q 30/06 705/7.31 |
| 2013/0132159 | A1* | 5/2013 | Wells ...................... G06Q 20/20 705/7.35 |
| 2013/0160079 | A1 | 6/2013 | Hebert |
| 2014/0047111 | A1 | 2/2014 | Petta et al. |
| 2014/0089042 | A1 | 3/2014 | Dufresne et al. |
| 2014/0108090 | A1 | 4/2014 | Hwang et al. |
| 2014/0129288 | A1 | 5/2014 | Eager et al. |
| 2014/0136339 | A1 | 5/2014 | Ringdahl |
| 2014/0214617 | A1 | 7/2014 | Plouffe et al. |
| 2014/0279189 | A1 | 9/2014 | Kubicki et al. |
| 2014/0304059 | A1 | 10/2014 | Wang et al. |
| 2015/0039417 | A1 | 2/2015 | Schweier |
| 2015/0220975 | A1 | 8/2015 | Rychak |
| 2017/0345011 | A1* | 11/2017 | Salami .................. G06Q 20/10 |

OTHER PUBLICATIONS

Basso et al., Preventing Massive Automated Access to Web Resources, Computers and Security 28, 2009, pp. 174-188, Retrieved from the Internet: https://www.researchgate.net/profile/Alessandro_Basso/publication/222660321_Preventing_massive_automated_access_to_web_resources/links/02fe5137bd77826ca000000.pdf, entire document.

Final Office Action, dated Aug. 31, 2016, from corresponding U.S. Appl. No. 14/145,474.

Final Office Action, dated Aug. 8, 2019, from corresponding U.S. Appl. No. 15/269,717.

Final Office Action, dated Dec. 21, 2018, from corresponding U.S. Appl. No. 14/586,201.

Final Office Action, dated Feb. 7, 2019, from corresponding U.S. Appl. No. 14/477,108.

Final Office Action, dated Mar. 31, 2015, from corresponding U.S. Appl. No. 14/145,474.

Final Office Action, dated May 1, 2019, from corresponding U.S. Appl. No. 15/178,226.

Final Office Action, dated Nov. 8, 2017, from corresponding U.S. Appl. No. 14/586,201.

International Preliminary Report of Patentability, dated Dec. 15, 2016, from corresponding International Application No. PCT/US2015/033544.

International Preliminary Report on Patentability, dated Jul. 5, 2016, from corresponding International Application No. PCT/US2014/072759.

International Preliminary Report on Patentability, dated Jul. 5, 2016, from corresponding International Application No. PCT/US2014/072771.

International Search Report, dated Apr. 23, 2015, from corresponding International Application No. PCT/US2014/072759.

International Search Report, dated Mar. 18, 2016, from corresponding International Application No. PCT/US2016/013273.

International Search Report, dated Mar. 26, 2015, from corresponding International Application No. PCT/US2014/072771.

International Search Report, dated Oct. 28, 2015, from corresponding International Application No. PCT/US2015/033544.

Notice of Allowance, dated Apr. 4, 2019, from corresponding U.S. Appl. No. 15/379,137.

Notice of Allowance, dated Nov. 30, 2016, from corresponding U.S. Appl. No. 14/597,029.

Office Action, dated Apr. 19, 2016, from corresponding U.S. Appl. No. 14/597,029.

Office Action, dated Feb. 14, 2019, from corresponding U.S. Appl. No. 15/269,717.

Office Action, dated Jan. 15, 2016, from corresponding U.S. Appl. No. 14/145,474.

Office Action, dated Jun. 20, 2018, from corresponding U.S. Appl. No. 14/586,201.

Office Action, dated Jun. 6, 2018, from corresponding U.S. Appl. No. 14/477,108.

Office Action, dated Mar. 2, 2017, from corresponding U.S. Appl. No. 14/586,201.

Office Action, dated May 14, 2014, from corresponding U.S. Appl. No. 14/145,474.

Office Action, dated Nov. 12, 2014, from corresponding U.S. Appl. No. 14/145,474.

Office Action, dated Oct. 17, 2018, from corresponding U.S. Appl. No. 15/379,137.

Office Action, dated Sep. 21, 2018, from corresponding U.S. Appl. No. 15/178,226.

Office Action, dated Sep. 5, 2019, from corresponding U.S. Appl. No. 14/477,108.

Restriction Requirement, dated Feb. 14, 2014, from corresponding U.S. Appl. No. 14/145,474.

(56) References Cited

OTHER PUBLICATIONS

Restriction Requirement, dated Jan. 29, 2016, from corresponding U.S. Appl. No. 14/597,029.
Restriction Requirement, dated Nov. 30, 2017, from corresponding U.S. Appl. No. 14/477,108.
Restriction Requirement, dated Oct. 4, 2018, from corresponding U.S. Appl. No. 15/269,717.
Rosenfeld, Spiders and Crawlers and Bots, Oh My: The Economic Efficiency and Public Policy of Online Contracts that Restrict Data Collection, In: Stanford Technology Law Review 3, 2002, Retrieved from https: //journals.law.stanford.edu/sites/default/files/stanford-technology-law-review/online/rosenfeld-spiders-crawlers-bots.pdf, entire document.
Sharon Linstedt—News, Business Reporter. (Dec. 11, 1994 ). How Supermarkets Vie to Keep You. Buffalo News Retrieved from http://search.proquest.com/docview/381043976?accountid=14753.
Written Opinion of the International Searching Authority, dated Apr. 23, 2015, from corresponding International Application No. PCT/US2014/072759.
Written Opinion of the International Searching Authority, dated Mar. 18, 2016, from corresponding International Application No. PCT/US2016/013273.
Written Opinion of the International Searching Authority, dated Mar. 26, 2015, from corresponding International Application No. PCT/US2014/072771.
Written Opinion of the International Searching Authority, dated Oct. 28, 2015, from corresponding International Application No. PCT/US2015/033544.
Office Action, dated Nov. 5, 2019, from corresponding U.S. Appl. No. 16/542,562.
Office Action, dated Oct. 31, 2019, from corresponding U.S. Appl. No. 14/586,201.
Restriction Requirement, dated Nov. 25, 2019, from corresponding U.S. Appl. No. 16/542,637.
Decision on Appeal, dated Jul. 29, 2019, from corresponding U.S. Appl. No. 14/145,474.
Office Action, dated Oct. 4, 2019, from corresponding U.S. Appl. No. 15/178,226.
Restriction Requirement, dated Jan. 15, 2020, from corresponding U.S. Appl. No. 16/542,630.
Office Action, dated Jan. 24, 2020, from corresponding U.S. Appl. No. 14/145,474.
Notice of Allowance, dated Apr. 14, 2020, from corresponding U.S. Appl. No. 16/542,562.
Office Action, dated Apr. 16, 2020, from corresponding U.S. Appl. No. 16/542,630.

\* cited by examiner

PRICE MINING AND PRODUCT RE-PRICING DATA PROCESSING SYSTEMS AND METHODS

CROSS-REFERENCE TO RELATED APPLICATIONS

This application is a continuation-in-part of U.S. patent application Ser. No. 15/379,137, filed Dec. 14, 2016, now U.S. Pat. No. 10,389,752, which is a continuation-in-part of U.S. patent application Ser. No. 14/597,029, filed Jan. 14, 2015, now U.S. Pat. No. 9,552,487, both of which are entitled "Price Mining Prevention Systems and Related Methods." This application is also a continuation-in-part of U.S. patent application Ser. No. 14/586,201, filed Dec. 30, 2014, entitled "Product Re-pricing Systems and Related Methods," which claims priority to U.S. Provisional Application No. 61/922,622, filed Dec. 31, 2013. The disclosures of all of the above patent applications and patents are hereby incorporated herein by reference in their entirety.

BACKGROUND

Online retailers and others may desire to price products they offer in a competitive manner to improve sales. Such retailers may further desire to prevent competitors from undercutting their prices. Accordingly, there is a need for improved systems and methods that address these needs.

In general, brick-and-mortar retail stores must physically adjust prices for any products that require the price to be changed. Typically, it is not possible to substantially automatically change all of the prices for a particular product in a brick-and-mortar retail store. In addition, repricing a particular product takes significant time and effort for a brick-and-mortar retail store. Also, once a brick-and-mortar retail store re-prices a particular item, it is difficult to again change the price for that particular item without expending additional time and effort.

SUMMARY

A non-transitory computer-readable medium storing computer-executable instructions for processing unwanted access source data associated with price mining on an online retail website by: (A) detecting, by one or more computer processors, an access to a particular web page containing pricing information; (B) determining, by one or more computer processors, whether a source of the access is an individual employed by one or more competitors of a company that owns the particular web page being accessed; and (C) at least partially in response to determining that the individual is employed by one or more competitors of a company that owns the particular web page being assessed, taking, by one or more computer processors, one or more defensive actions against the source of the access.

A computer-implemented method for processing unwanted access source data associated with price mining on an online retail website, the computer-implemented method comprising the steps of: (A) detecting, by one or more computer processors, an access to a particular web page containing pricing information; (B) determining, by one or more computer processors, whether a source of the access is an individual that is employed by one or more competitors of a company and that owns the particular web page being accessed; (C) determining, by one or more computer processors, a job title of the individual; (D) determining, by one or more computer processors, based on the job title, that the individual should be prohibited from obtaining pricing information from the online retail website; and (E) in response to determining that the individual should be prohibited from obtaining pricing information from the online retail website, taking, by a processor, one or more defensive actions against the source of the access.

In general, in various embodiments, a computer system for processing product re-pricing data includes at least one processor, wherein the computer system is configured for: (1) displaying, on a display associated with a particular product in a brick-and-mortar store, a first price for the particular product; (2) determining one or more competing prices for the particular product; (3) adjusting the first price to a second price based at least in part on the one or more competing prices; and (4) displaying, on the display associated with the particular product in the brick-and-mortar store, the second price for the particular product.

In an illustrative embodiment, a computer-implemented method of processing product re-pricing data adjusting a price for a particular product includes (1) displaying, by a processor, on one or more displays in a brick-and-mortar retail store, a price for a particular product offered for sale in the brick-and-mortar retail store; (2) receiving, by a processor, pricing information for the particular product, the pricing information comprising one or more competing prices for the particular product; (3) adjusting, by a processor, the price for the particular product based at least in part on the one or more competing prices; and (4) updating the price for the particular product in at least one of: (i) a database of pricing information for one or more products offered for sale in the brick-and-mortar retail store; (ii) the one or more displays in the brick-and-mortar retail store; and (iii) one or more advertisements for sale of the particular product associated with the brick-and-mortar retail store.

In an illustrative embodiment, a non-transitory computer-readable medium stores computer-executable instructions for processing product re-pricing data, including instructions for: (1) adjusting a price for a particular product offered for sale at a brick-and-mortar retail store based at least in part on one or more factors selected from a group consisting of: (i) one or more competing prices for the particular product; (ii) sales information associated with the particular product; and (iii) geographic information associated with the brick-and-mortar retail store; and (2) displaying the adjusted price on one or more displays associated with the particular product in the brick-and-mortar retail store.

BRIEF DESCRIPTION OF THE DRAWINGS

Various embodiments of a system and method for pricing products are described below. In the course of this description, reference will be made to the accompanying drawings, which are not necessarily drawn to scale, and wherein.

DETAILED DESCRIPTION

Figure 1:
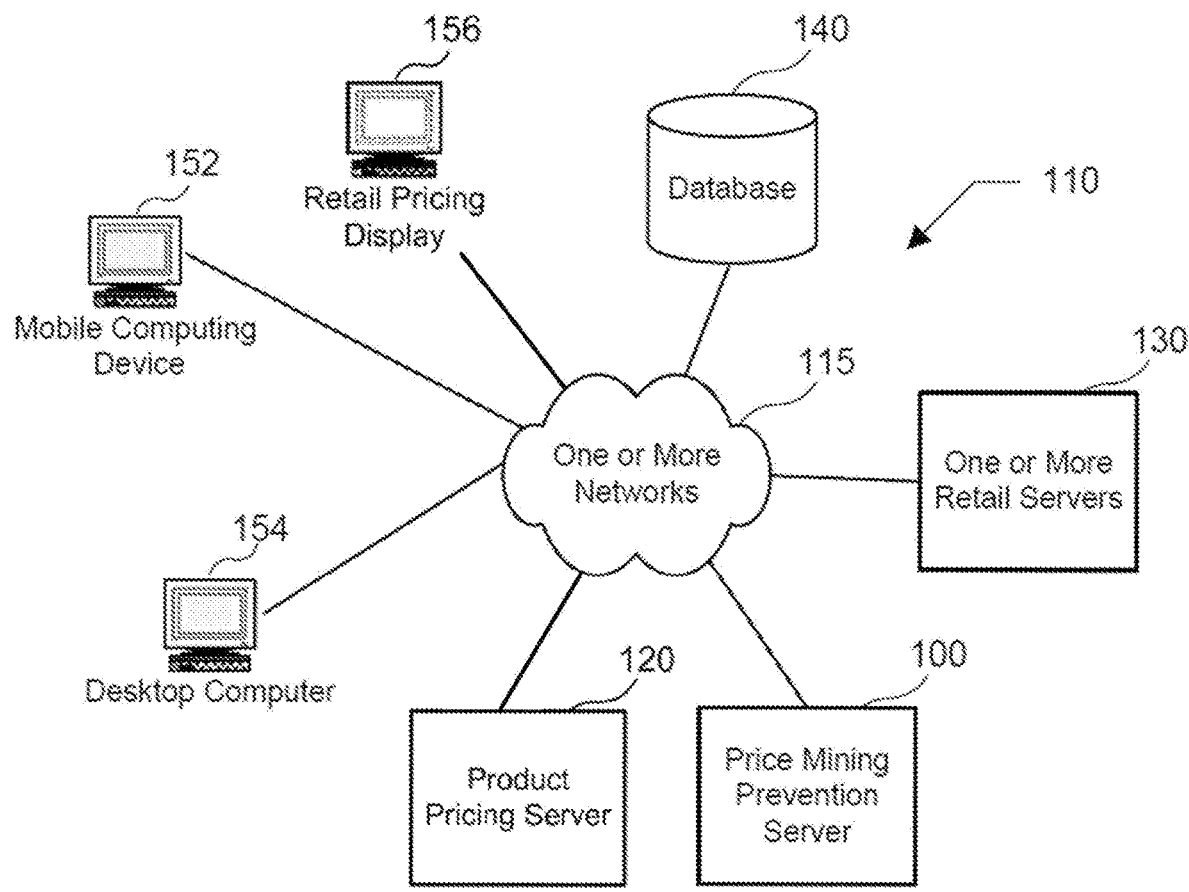
FIG. 1 is a block diagram of a system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Various companies may attempt to mine data from websites and other sources about their competitors using bots and/or people to access the data. This data may include, for example, product data, pricing data, and other suitable data associated with one or more products offered for sale via a particular web page. In particular embodiments, a price mining prevention system may be configured to detect and analyze website access and enable website administrators to implement one or more defenses to prevent unwanted access. In various embodiments, the system may, for example: (1) detect access to a web page from a particular source; (2) determine whether the particular source may be an unwanted source; and (3) at least partially in response to determining that the particular source is an unwanted source, take a defensive action against the particular source (e.g., by blocking further access from that particular source).

In particular embodiments, the system may be configured to determine that a particular access of a web page is a potentially unwanted access based at least in part on: (1) an IP address from which the web page was accessed (e.g., a particular competitor may own a particular range of one or more IP addresses and the accessing IP address may be within that particular range); (2) a zip code associated with an IP address from which the web page was accessed (e.g., because a particular competitor may have offices or be headquartered at that zip code); (3) a user associated with the IP address from which the web page was accessed (e.g., the user may be an employee of a competitor or associated with a competitor); (4) an access pattern from a particular IP address (e.g., systematic access from a particular IP address); and/or (5) any other suitable factor.

In various embodiments, the system is configured to track access to one or more websites (e.g., one or more related websites associated with a particular company). The system may then identify access patterns (e.g., from a particular IP address) in order to determine whether a particular access is substantially automated. The system may make this determination based at least in part on: (1) frequency of access (e.g., how often the website is accessed); (2) number of particular web pages accessed; and/or (3) any other suitable factor.

In particular embodiments, at least partially in response to determining that a particular access may be substantially automated (e.g., the access may be by a bot rather than a human user), the system may be configured to verify that the access is by a human by requiring completion of one or more Completely Automated Public Turing Tests to tell Computers and Humans Apart (CAPTCHA). In other embodiments, the system may be configured to substantially automatically block access from a source determined to be substantially automated.

In other embodiments, the system may be configured to substantially prevent access to one or more particular web pages by particular human users (e.g., in addition to automated bots). For example, the system may be configured to block access to one or more particular web pages by employees or other persons associated with a particular company who may be attempting to access web pages to ascertain data such as the data described above. In various embodiments, the system may be configured to identify individuals accessing a particular web page as individuals associated with a competitor by, for example: (1) requiring individuals accessing the particular web page to register an account; and (2) using a particular individual's account information to determine if the individual is a known employee of a competitor (e.g., because the individual is listed as an employee on the competitor's web page or other publicly available employee list).

In various embodiments, the system may be configured to determine that a particular individual is an employee of or otherwise associated with a competitor based at least in part on social networking data associated with the particular individual. For example, the system may search one or more social networks for users that have registered with a similar name or email address as a particular individual that has registered for an account with their web page. The system may then be configured to mine any associated social network accounts (e.g., Facebook, Twitter, Foursquare, Instagram, etc.) to determine an employer of the particular individual as well as any other potentially useful information about the individual.

In various embodiments, the system is configured to analyze website access and determine and implement particular defensive measures (e.g., blocking, CAPTCHA requirement, etc.) substantially in real time. In other embodiments, the system is configured to review and analyze access data from a log of access information at a later time from when the access occurred.

In particular embodiments, the system is embodied as a plugin for a particular website that is offered as a service provided by a price mining prevention company. In various embodiments, the system (or the price mining prevention company) may track access by all customers of the service, which may, for example, enable the price mining prevention company to determine unwanted access, which may come from one or more non-competitor sources (e.g., access from third party companies hired by competitors of their companies to monitor pricing data).

In various embodiments, a price mining prevention system may enable websites to at least substantially reduce unwanted web traffic to their websites. In particular embodiments, the system may enable websites to substantially prevent competitors from accessing pricing and other data available on their websites.

A system for re-pricing one or more products, in various embodiments, is configured to substantially automatically adjust a price of a particular product based at least in part on one or more prices charged by other retailers for the same (or a similar) particular product. In particular embodiments, the system is configured for: (1) determining one or more competing prices for a particular product; (2) adjusting a price charged for the particular product at one or more brick-and-mortar retail locations based at least in part on the competing prices; and (3) updating the price for the particular product on one or more electronic displays associated with the particular product, in a pricing database for the one or more brick-and-mortar retail locations, and/or in one or more advertisements for the particular product.

In particular embodiments, the system comprises a plurality of electronic product pricing displays at one or more brick-and-mortar retail locations, which may, for example, comprise one or more product pricing displays located adjacent product displays or shelving within the one or more brick- and mortar retail locations. In various embodiments, the one or more displays may include any suitable display such as, for example, one or more LED displays, one or more LCD displays, one or more Plasma displays, etc. In particular embodiments, the one or more displays are configured to receive and display pricing and other product information for one or more particular products, which may, for example, be positioned adjacent the one or more displays within the brick-and-mortar retail stores. In various embodiments, the one or more displays are configured to receive the pricing and product information via any suitable wireless protocol, such as, for example, WI-FI, Bluetooth, Near Field Communication, Low Energy Bluetooth, etc.

In particular embodiments, the system is configured to substantially automatically adjust a price for a particular product and then: (1) display the updated price on any of the one or more displays associated with the particular product in the brick-and-mortar retail store; (2) update the price associated with the particular product in a pricing database associated with the brick-and-mortar retail store; and/or (3) update any advertisements to reflect the adjusted price (e.g., update any web advertisements for in store prices, send one or more electronic messages to one or more customers of the brick-and-mortar retail store advising them of the price change, etc.).

In various embodiments, the system is configured to adjust the price for the particular product based at least in part on: (1) one or more competing prices for the particular product (e.g., one or more prices charged by one or more competitors for the particular product); (2) sales of the particular product (e.g., the system may substantially automatically adjust a price lower for a poorly selling product or higher for a best-selling product in order to increase anticipated sales and/or profits; (3) one or more geography-specific considerations associated with the location of the brick-and-mortar retail store (e.g., the system may substantially automatically adjust the price for a particular product based on weather conditions near the brick-and-mortar retail store, based on a season such as winter or summer that the area around the brick-and-mortar retail store is currently experiencing, etc.); (4) sales and/or pricing information for one or more products that are substantially similar to the particular product (e.g., products having similar features that are of a different brand, etc.); and/or (5) any other suitable factor. In particular embodiments, the system is further configured to facilitate a transaction between the brick-and-mortar retail store and customer for the particular product at the adjusted price.

In embodiments in which the system is configured to adjust the price of the particular product based at least in part on the one or more competing prices, the system may be configured to receive the one or more competing prices using any suitable technique. In a particular embodiment, the system is configured to identify product listings for the particular product and derive pricing information from the product listings using the techniques described in U.S. patent application Ser. No. 14/145,474, entitled "Product Matching Systems and Related Methods," filed Dec. 31, 2013, which is hereby incorporated by reference in its entirety. In various embodiments, the system may be further configured to display the one or more competing prices on the one or more electronic displays along with the price for the particular product (e.g., to convey to customers that the particular product can be purchased at the brick-and-mortar retail store for a price that may be competitive with other retailers such as online retailers).

In various embodiments, the system is configured to enable a user to provide one or more re-pricing rules that the system may use to adjust the price of the particular product. For example, the user may provide one or more re-pricing rules that include: (1) a rule to match the lowest competing price; (2) a rule to adjust the price to within a particular amount of the lowest competing price; and/or (3) any other suitable re-pricing rule.

In particular embodiments, the system is configured to adjust the price of the particular product according to a particular, pre-determined schedule (e.g., hourly, weekly, daily, monthly, every minute, etc.). In other embodiments, the system is configured to adjust the price of the particular product at least partially in response to a request from a user associated with the brick-and-mortar retail store. In still other embodiments, the system is configured to adjust the price of the particular product substantially continuously (e.g., continuously).

In various embodiments, the system is configured to adjust the price for the particular product at a single brick-and-mortar retail store. In other embodiments, the system is configured to adjust the price at a plurality of retail stores (e.g., a plurality of retail stores in a particular geographic area). In still other embodiments, the system is configured to adjust the price at all brick-and-mortar retail stores controlled by a particular entity.

In particular embodiments, re-pricing of products in brick-and-mortar stores may enable brick-and-mortar retail locations to compete more effectively with online retail stores which may, for example, offer lower prices on particular products. In other embodiments, the system may enable brick-and-mortar retail stores to avoid reverse showrooming by customer (e.g., avoid having customers come to the brick-and-mortar retail store, try out a particular product in person, and then order the particular product form an online retailer rather than purchasing it from the brick-and-mortar retail store).

Example Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a System 110 according to a particular embodiment. As may be understood from this figure, the System 110 includes One or More Networks 115, a Price Mining Prevention Server 100, a Product Pricing Server 120, One or More Retail Servers 130, a Database 140, one or more remote computing devices, such as a Mobile Computing Device 152 (e.g., a smart phone, a tablet computer, a wearable computing device, a laptop computer, etc.), a Desktop Computer 154, and/or an electronic Retail Pricing Display 156. In particular embodiments, the One or More Networks 115 facilitate communication between any of the Price Mining Prevention Server 100, One or More Retail Servers 130, the Database 140, the Product Pricing Server 120, and the one or more remote computing devices 152, 154, 156.

In various embodiments, the electronic Retail Pricing Display 156 may comprise an electronic display (e.g., an L.E.D. display, a plasma display, an LCD display, or any other suitable display) that is operatively coupled to a processor and memory. The electronic Retail Pricing Display 156 may also comprise a network module that is operatively coupled to the processor. The network module may be a wired network module, a wireless network module or any other suitable network module (e.g., near-field Bluetooth module, etc.) that allows the system to operatively communicate with the electronic Retail Pricing Display 156. In various embodiments, the electronic Retail Pricing Display 156 contains a power source (e.g. a rechargeable battery, a replaceable battery, etc.) that provides a source of energy to the various electronic components of the electronic Retail Pricing Display 156.

The One or More Networks 115 may include any of a variety of types of wired and/or wireless computer networks such as the Internet, a private intranet, a mesh network, a public switch telephone network (PSTN), or any other type of network (e.g., a network that uses Bluetooth or near field communications to facilitate communication between computers). The communication link between the Price Mining Prevention Server 100 and Database 140 may be, for example, implemented via a Local Area Network (LAN) or via the Internet. In another example, the communication link between Product Pricing Server 120 and Database 140 may be, for example, implemented via a Local Area Network (LAN) or via the Internet.

Figure 2:
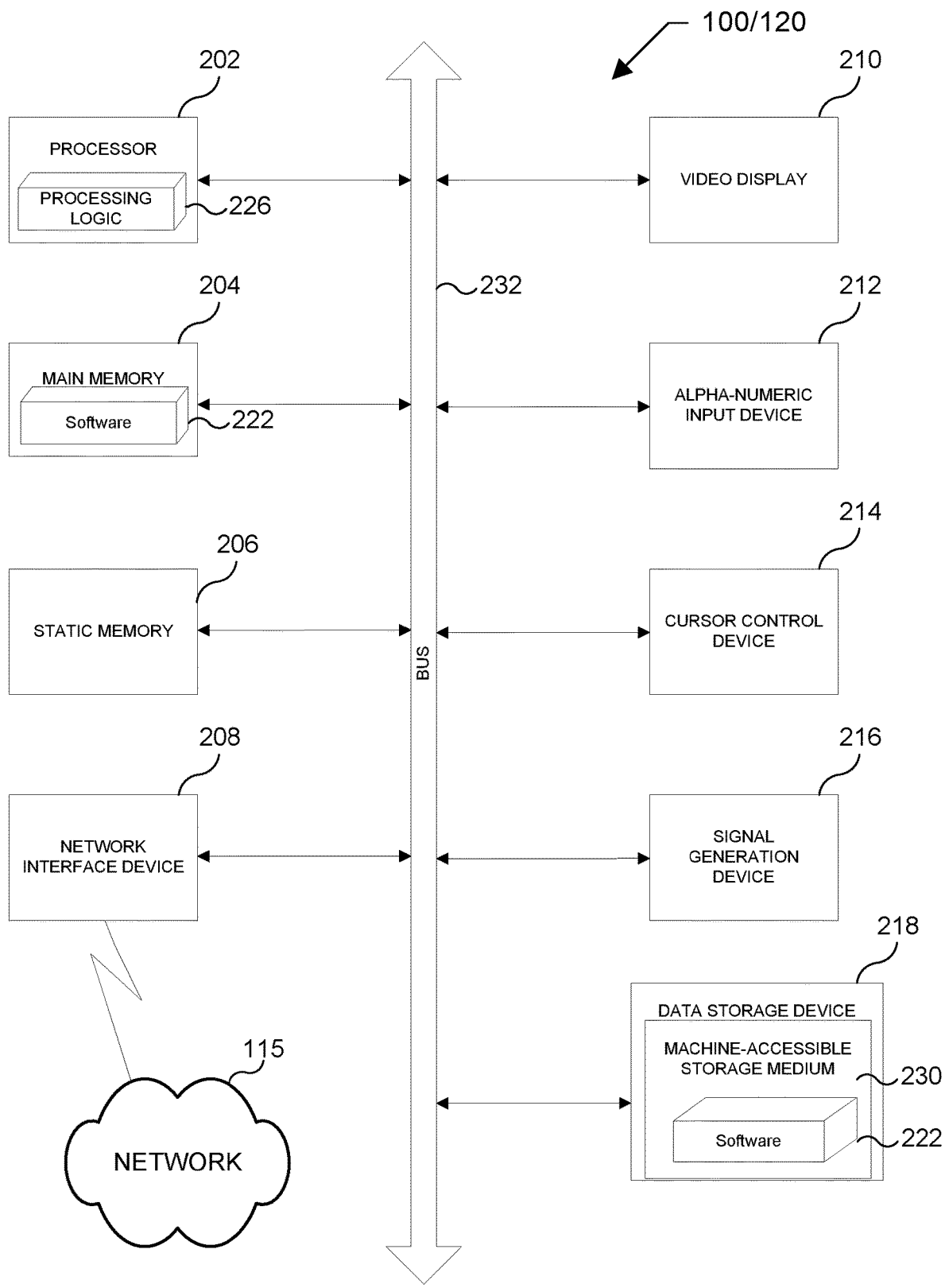
FIG. 2 is a schematic diagram of a computer, such as the system of FIG. 1, that is suitable for use in various embodiments.

FIG. 2 illustrates a diagrammatic representation of a Computer 100/120 that can be used within the System 110, for example, as a client computer (e.g., one of the remote computing devices 152, 154, 156 shown in FIG. 1), or as a server computer (e.g., Price Mining Prevention Server 100, Product Pricing Server 120 shown in FIG. 1). In particular embodiments, the Computer 100/120 may be suitable for use as a computer within the context of the System 110 that is configured for collecting, tracking, and storing price mining prevention data. In other embodiments, the Computer 100/120 may be suitable for use as a computer within the context of the System 110 that is configured for collecting, tracking, and storing product pricing data. In various embodiments, the Computer 100/120 may be suitable for use as a Price Mining Prevention Server 100, a Product Pricing Server 120, or a computer combining functions of both a Price Mining Prevention Server 100 and a Product Pricing Server 120.

In particular embodiments, the Computer 100/120 may be connected (e.g., networked) to other computers in a LAN, an intranet, an extranet, and/or the Internet. As noted above, the Computer 100/120 may operate in the capacity of a server or a client computer in a client-server network environment, or as a peer computer in a peer-to-peer (or distributed) network environment. The Computer 100/120 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An example Computer 100/120 includes a Processor 202, a Main Memory 204 (e.g., read-only memory (ROM), flash memory, dynamic random access memory (DRAM) such as synchronous DRAM (SDRAM) or Rambus DRAM (RDRAM), etc.), a Static Memory 206 (e.g., flash memory, static random access memory (SRAM), etc.), and a Data Storage Device 218, which may communicate with each other via a Bus 232.

The Processor 202 represents one or more general-purpose or specific processors such as a microprocessor, a central processing unit, and the like. More particularly, the Processor 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The Processor 202 may also be one or more special-purpose processors such as an application specific integrated circuit (ASIC), a field programmable gate array (FPGA), a digital signal processor (DSP), a network processor, and the like. The Processor 202 may be configured to execute Processing Logic 226 for performing various operations and steps discussed herein.

The Computer 100/120 may further include a Network Interface Device 208. The Computer 100/120 may also include a Video Display 210 (e.g., a liquid crystal display (LCD) or a cathode ray tube (CRT)), an Alpha-Numeric Input Device 212 (e.g., a keyboard), a Cursor Control Device 214 (e.g., a mouse), and a Signal Generation Device 216 (e.g., a speaker).

The Data Storage Device 218 may include a Machine-Accessible Storage Medium (e.g., a non-transitory computer-accessible storage medium) 230 (also known as a non-transitory computer-readable storage medium or a non-transitory computer-readable medium) on which is stored one or more sets of instructions (e.g., Software 222) embodying any one or more of the methodologies or functions described herein (e.g., Automated Access Determination Module 300, Unwanted Human Access Determination Module 400, Price Mining Prevention Module 500, Re-Pricing Module 600, Updating Re-Pricing Module 700, and/or Factor-Based Re-Pricing Module 800). The Software 222 may also reside, completely or at least partially, within the Main Memory 204 and/or within the Processor 202 during execution thereof by the Computer 100/120, with the Main Memory 204 and/or the Processor 202 also constituting computer-accessible storage media. The Software 222 may further be transmitted or received over One or More Networks 115 via a Network Interface Device 208.

While the Machine-Accessible Storage Medium 230 is shown in an example embodiment to be a single medium, the terms "computer-accessible storage medium" and "computer-readable medium" should be understood to include a single medium or multiple media (e.g., a centralized or distributed database, and/or associated caches and servers) that store the one or more sets of instructions. The terms "computer-accessible storage medium" and "computer-readable medium" should also be understood to include any medium (e.g., non-transitory medium) that is capable of storing, encoding, or carrying a set of instructions for execution by the Computer 100/120 and that cause the Computer 100/120 to perform any one or more of the methodologies of the present invention. The terms "computer-accessible storage medium" and "computer-readable medium" should accordingly be understood to include, but not be limited to, solid-state memories, optical and magnetic media, etc.

Example System Platform

Various embodiments of a system for preventing price and other data mining on one or more online retail websites and for re-pricing one or more products according to various embodiments are described below and may be implemented in any suitable context. Various aspects of the system's functionality may be executed by certain system modules, including Automated Access Determination Module 300, Unwanted Human Access Determination Module 400, Price Mining Prevention Module 500, Re-Pricing Module 600, Updating Re-Pricing Module 700, and/or Factor-Based Re-Pricing Module 800. These modules are discussed in greater detail below.

Automated Access Determination Module

Figure 3:
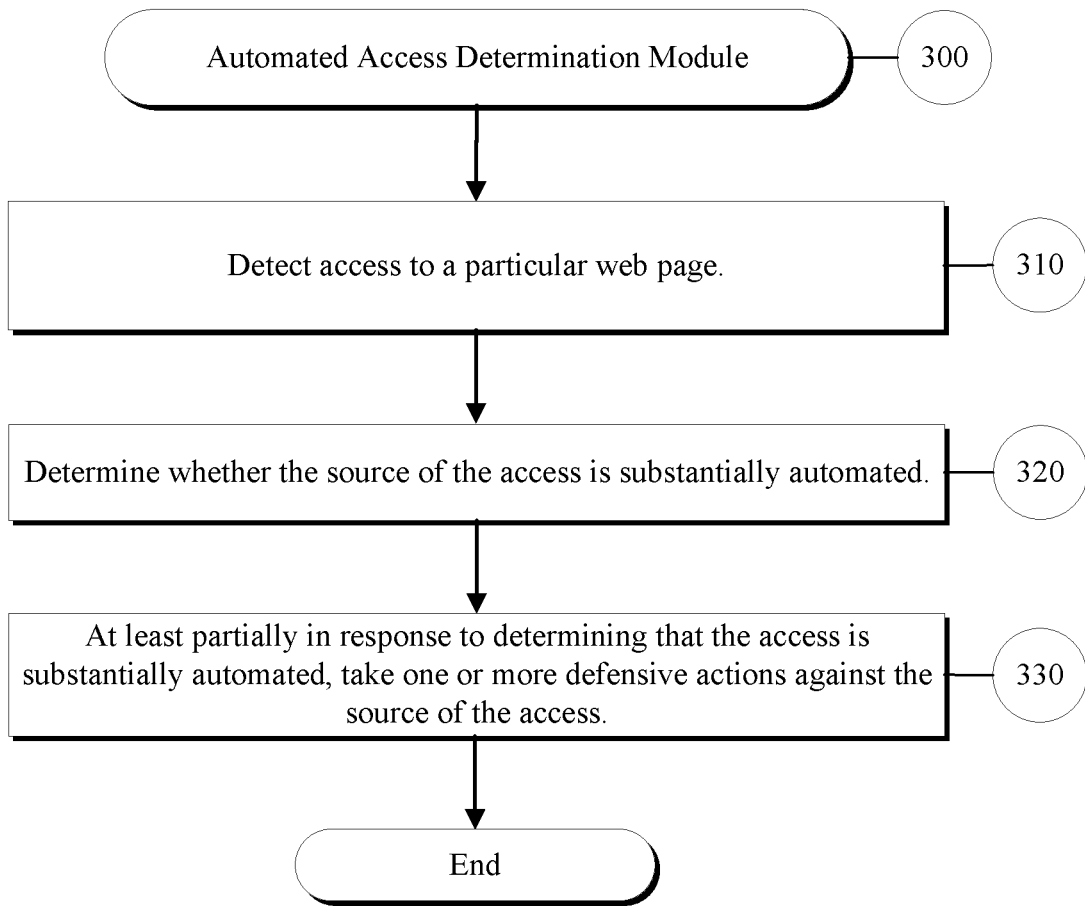
FIG. 3 depicts a flow chart that generally illustrates various steps executed by an automated access determination module that, for example, may be executed by the system of FIG. 1.

FIG. 3 is a flow diagram of an exemplary Automated Access Determination Module 300. The Automated Access Determination Module 300 may, for example, be implemented by a computer system such as the System 110 of FIG. 1. Returning to FIG. 3, at Step 310, the system begins by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, or when the web page is accessed directly by the web page address being entered into the address bar of a suitable internet browser.

When the system detects access to the web page at Step 310, the system may, for example, collect data associated with the source of the access such as the IP address, the operating system information, the web browser information, the user agent string, the search terms used to access the web page, the advertising link used to access the web page, or other information relating to the method used to access the web page or the source of the access.

The system then advances to Step 320, where it determines, at least partially based on the data associated with the source of the access, whether the source of the access may be substantially automated. In various embodiments, the system is configured to detect substantially automated access such as by one or more bots or one or more web crawlers. The system may use the data associated with the source of the access to determine that the access is substantially automated by retrieving information on access patterns of the source of the access. Such access patterns may include the frequency of the access and the number of web pages accessed within a particular website. For instance, if the access pattern shows that a particular IP address frequently accesses the same web page, the system may determine that the source of the access is automated. In addition, if the system detects that a particular IP address accesses every web page of a particular website, the system may also determine that the source of the access is automated.

Access patterns may also include similar access patterns based on other factors than the data associated with the source. For instance, the system may determine access patterns based on frequent access to web pages for particular products, for instance, an Apple iPad Air, or for particular types of products, for instance, a tablet computing device. The system may, for example, be configured to determine that a particular access is substantially automated based at least in part on determining that a source of access accesses one or more products from a particular class of products during a particular access of a particular website.

For example, a source of access may access one or more web pages of a particular online retail website during a particular visit. The system may determine, for example, that the source of access has accessed a greater number of product pages during a particular visit than a typical user (e.g., a typical online shopper) would access during a typical visit. For example, the system may determine that a typical user, when shopping for televisions, visits a product page for a particular number of televisions before making a purchase (e.g., the user may view information for between about 4 and about 6 televisions before making a purchase). In such embodiments, the system may determine that a source of access that views product and pricing information for more than about ten different televisions during the visit is likely to be a substantially automated access (e.g., because a typical user would not likely have viewed so many televisions during a single visit). In various embodiments, the system may determine that a source of access viewing product information for such a large number of products is more likely to be a source that is simply substantially automatically mining data rather than a legitimate user of the website.

In advancing to Step 330, the system then, at least partially in response to determining that the access is substantially automated, takes one or more defensive actions against the source of the access. In various embodiments, the defensive action may include determining whether the source of the access is a human. In various embodiments, the system may determine whether the source is a human by requiring registration of a user account to continue to access the web page. If no user account is created, the system may deny access to the web page from the particular source. In other embodiments, the system may require completion of a CAPTCHA before the source can continue to access the web page. At least partially in response to determining that the source of the access has not completed the CAPTCHA, the system may deny access to the web page. In still other embodiments, the system may take any other suitable defensive action to verify that the source is a human and not an automated source.

Unwanted Human Access Determination Module

Figure 4:
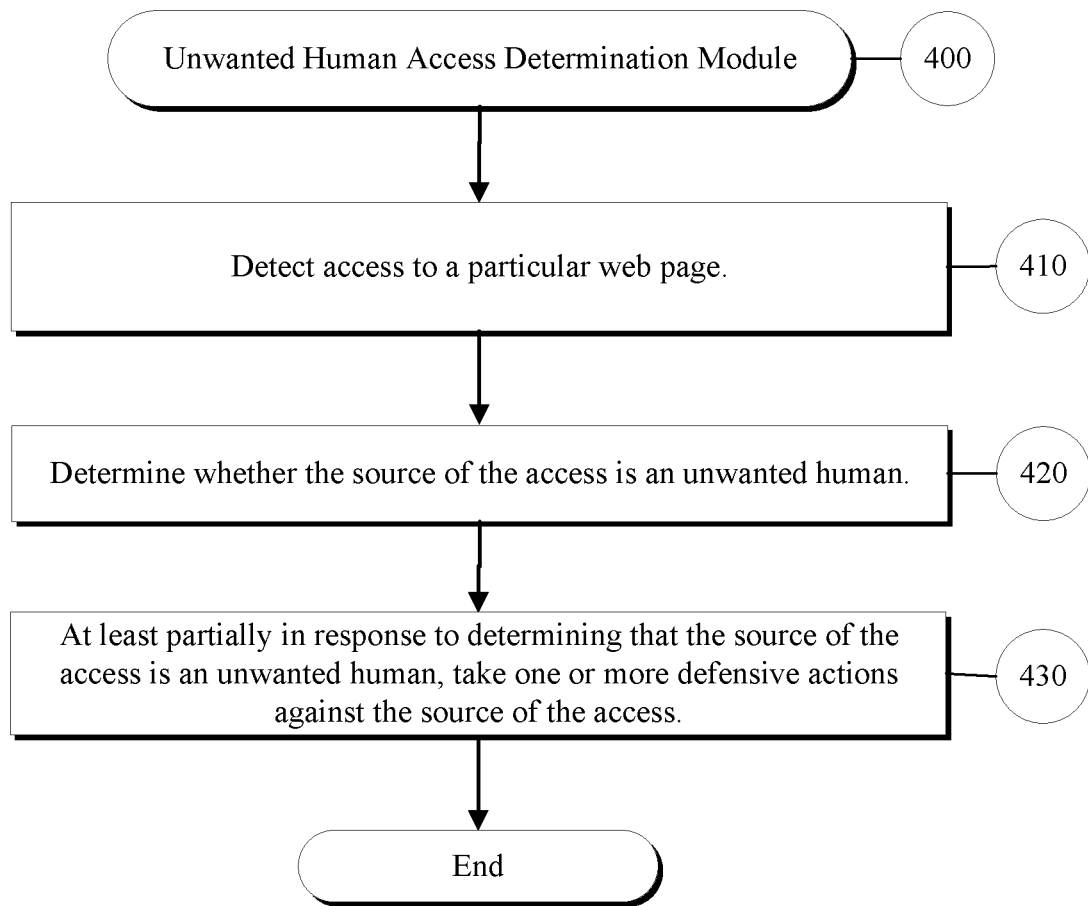
FIG. 4 depicts a flow chart that generally illustrates various steps executed by an unwanted human access determination module that, for example, may be executed by the system of FIG. 1.

FIG. 4 is a flow diagram of an exemplary Unwanted Human Access Determination Module 400. The Unwanted Human Access Determination Module 300 may, for example, be implemented by a computer system such as the System 110 of FIG. 1. Turning again to FIG. 4, the system begins at Step 410 by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, when the web page is accessed directly from the web page address being entered into the address bar of a suitable internet browser, or in any other suitable way.

When the system detects access to the web page at Step 410, the system, in various embodiments, collects data associated with the source of the access such as: (1) IP address information; (2) operating system information; (3) web browser information; (4) one or more user agent strings; (5) one or more search terms used to identify and/or access the web page; (6) an advertising link used to access the web page; and/or (7) other information relating to the method used to access the web page and/or the source of the access. The system may, in particular embodiments, collect other information about the source of the access including an email address if the source has a registered account for the web page, or other information associated with the registered account such as, for example, a name of the user, an address of the user, etc.

Proceeding to Step 420, the system determines, based at least in part on information associated with the source of the access, whether the source of the access may be an unwanted human. The system may gather this information, for example, from the IP address of the source, the email address if the source has a registered account with the web page, the operating system of the source, the web browser information of the source, the user agent string of the source, or any other suitable information. In a particular embodiment, the system is configured to determine a location (e.g., a particular city or area from which the source of the access originates) of the source of the access (e.g., based at least in part on an IP address of the source) and further determine whether the determined location may be a location from which access is not desired. For example, the system may determine that the location of the source is a location associated with a particular competitor, particular independent company that is known for providing price-mining or other data-mining services, etc. The system may, in response to making such a determination, determine that the source is an unwanted one.

In various embodiments, the source of the access may register or have a registered account for the web page the user is accessing that is the same email address used on another website such as a social networking site, a professional networking site, or other website (e.g., Facebook, LinkedIn, Twitter, Google, Spokeo, Pipl, county tax assessor's property records, etc.). The system, in various embodiments, may then conduct a search (e.g., an automated search) of these websites in order to determine, for example, the source's name, alma mater(s), occupation, one or more businesses the source is following (e.g., on the social media website), one or more groups the source is a part of, one or more businesses where the source has "checked in," current and past employers of the source, one or more addresses of the source, one or more neighbors of the source based on the current or previous address, one or more friends or connections of the source, one or more relatives of the source, the current and past employers of the neighbors and/or friends or relatives, etc.

After gathering the information on the source of the access, the system may determine that the source accessing the web page may be an unwanted human based on the source being an employee or independent contractor of a competitor, a friend of an employee of a competitor, a relative of an employee of a competitor, a neighbor of an employee of a competitor, or any other person that is likely to be attempting to gain access to the web page for pricing or other information. For example, if the system determines that the same email address used to register at the website was the same email address linked to a specific Facebook account, the system may (e.g., at least substantially automatically) access the source's Facebook page to determine the employer of the source of the access. In a particular example, in response to the system determining that the employer of the source of the access is a competitor to the owner of the web page being accessed, the system may determine that the source of the access is an unwanted human. Similarly, the system may also be configured to see employers of the friends of the source of the access who do not have such access protected with privacy settings. In response to the system determining that the employer of the friend of the source of the access is a competitor to the owner of the web page being accessed, the system may determine that the source of the access is an unwanted human.

In particular embodiments, the system is further configured to determine that the source of the access is an unwanted human based, at least in part, on other information related to the source. For instance, in response to the system determining that the IP address is associated with owned by a competitor, the system may determine that the source is an unwanted human. In addition, if the email address of the source of the access is owned by a competitor, the system may determine that the source is an unwanted human. In other embodiments, the system may be configured to determine whether a domain associated with the email address of the source is associated with a potential competitor, or one or more potential third party companies that a competitor may have contracted with to mine pricing information and other data. The system may, for example, conduct a string search of an email address associated with the source to determine whether the name of a particular entity is included in the e-mail address or the e-mail domain. In various embodiments, the one or more third party companies may include, for example, one or more law firms, one or more auditing companies, one or more price consulting companies, or any other company which may be mining pricing data. Furthermore, if the geographic region associated with the IP address of the source of the access is similar to or the same as the geographic region where a competitor has an office, the system may determine that the source is likely to be an unwanted human.

In the next step, Step 430, the system, at least partially in response to determining that the source of the access is an unwanted human, takes one or more defensive actions against the source of the access. In various embodiments, the defensive action can be to block the source of the access to the web page. The system may block the source by blocking the IP address associated with the unwanted human. In other embodiments, the system may, for example, limit a number of access by the particular source determined to have been an unwanted human (e.g., to only 1, 2, 3, 4, 5 or other predetermined number of visits within a particular time period, such as per day). In particular embodiments, the system is configured to limit a number of accesses by a source determined to have been an unwanted human to between one and ten accesses per day (e.g., 2, 3, 4, 5, 6, or 7 accesses per 24 hour period). Such a course of action may, for example, enable the system to prevent an unwanted human from mining data from a particular online retail website, but still allow the unwanted human to patronize the online retail website (e.g., to shop on the online retail website outside the context of the user being an employee of a competitor). In other embodiments, the system may take any other suitable defensive action to block or otherwise limit the access to the website of the unwanted human.

Price Mining Prevention Module

Figure 5:
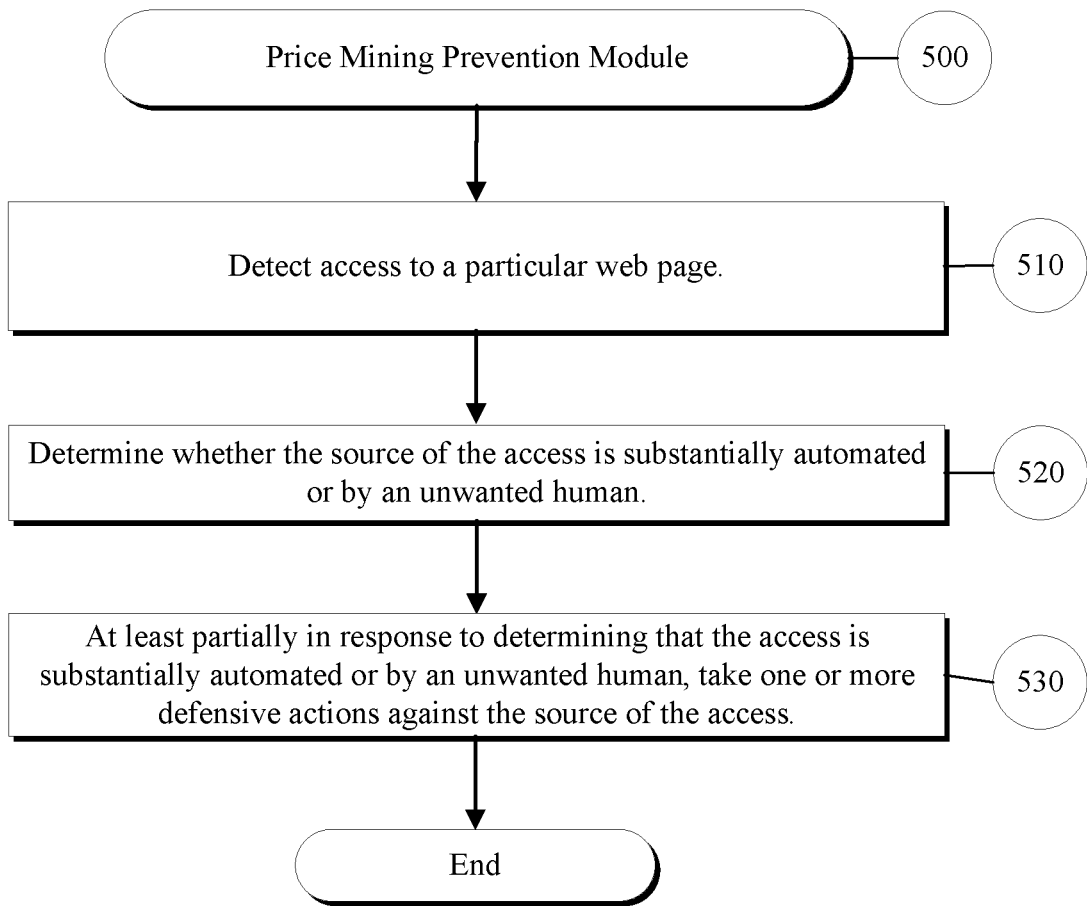
FIG. 5 depicts a flow chart that generally illustrates various steps executed by a price mining prevention module that, for example, may be executed by the system of FIG. 1.

FIG. 5 is a flow diagram of an exemplary Price Mining Prevention Module 500. The Price Mining Prevention Module 500 may, for example, be implemented by a computer system such as the System 110 of FIG. 1. Turning again to FIG. 5, the system begins at Step 510 by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, or when the web page is accessed directly from the web page address being entered into the address bar of a suitable internet browser.

In response to detecting access to the web page at Step 510, the system, in various embodiments, collects data associated with the source of the access such as: (1) IP address information; (2) operating system information; (3) web browser information; (4) one or more user agent strings; (5) one or more search terms used to identify and/or access the web page; (6) an advertising link used to access the web page; and/or (7) other information relating to the method used to access the web page and/or the source of the access. The system may, in particular embodiments, collect other information about the source of the access including an email address if the source has a registered account for the web page, or other information associated with the registered account such as, for example, a name of the user, an address of the user, etc.

Next, in Step 520, the system determines whether the access is substantially automated or by an unwanted human. In determining whether the access is substantially automated, the system, in various embodiments, may undergo the same process detailed in Step 320 in FIG. 3. Similarly, in determining whether the access is by an unwanted human, the system may undergo the same process detailed in Step 420 in FIG. 4.

Turning to FIG. 5, after completing Step 520, the system proceeds to Step 530 where, at least partially in response to determining that the source of the access may be substantially automated or by an unwanted human, the system take one or more defensive actions against the source of the access. Such defensive actions may include, for example, blocking access to the web page, requiring the source of the access to register for a user account, or requiring the source of the access to complete a CAPTCHA. Requiring the source to register with the web page may enable the system to collect more information about the source to determine with greater certainty that the source is an unwanted human. In addition, if no user account is created, the system may be configured to deny access to the web page. In various embodiments, the system is configured to block access at the router level, at the network level, on a software level, or in any other suitable manner.

In various embodiments the system is configured to further determine whether a source determined to be substantially automated is, in fact, unwanted. In such embodiments, the system may be configured to determine whether a substantially automated source is a favorable source, such as a search engine web crawler or other favorable source, which may, for example, direct or increase traffic to the particular web page. In such embodiments, the system is configured to determine whether the substantially automated source may be favorable, and, in response to determining that it may be favorable, not take any defensive action against that particular favorable automated source.

In other embodiments, the system is configured to provide access to a modified version of a web page to one or more sources of access that the system has determined to be unwanted. The system may, for example: (1) determine that a potentially unwanted source of access is attempting to access a particular web page; (2) at least partially alter data associated with the particular web page to create a modified web page; and (3) provide access to the unwanted source of access to the modified web page. In various embodiments, the data associated with the particular website that the system is configured to at least partially alter may include, for example, pricing information for a particular product, one or more specifications associated with a particular product, or any other suitable product or other data which an unwanted user may be attempting to ascertain.

In particular embodiments, the system is configured to alter pricing information for a particular product on a particular product web page so that the particular product web page displays incorrect pricing information (e.g., pricing information that is higher or lower than the actual price at which the product is offered for sale on the particular web page). In other embodiments, the system is configured to display the correct pricing information as an image rather than as text (e.g., which may, for example, make it more difficult for a source mining pricing information from easily ascertaining pricing information from the particular product page). In still other embodiments, the system is configured to not display any pricing information in response to determining that a potentially unwanted source of access is attempting to access the particular product page. In such embodiments, the system may be configured to allow an unwanted source of access to successfully mine incorrect data.

Re-Pricing Module

Figure 6:
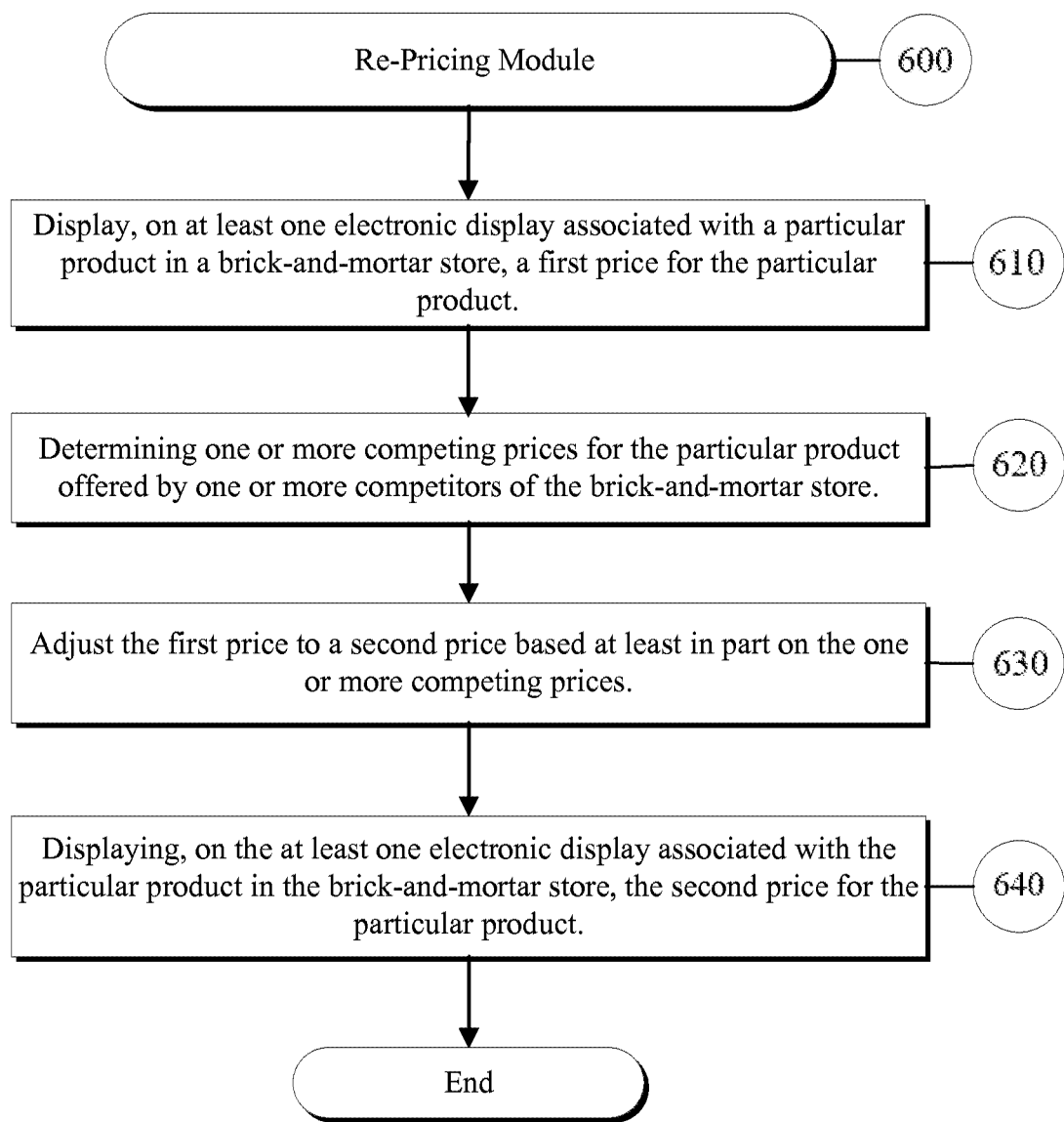
FIG. 6. depicts a flow chart that generally illustrates various steps executed by a product re-pricing module that, for example, may be executed by the system of FIG. 1.

FIG. 6 is a flow chart of operations performed by an exemplary Re-Pricing Module 600, which may, for example, run on the Product Pricing Server 120, or any other suitable computing device (such as a suitable mobile computing device). In particular embodiments, the Re-Pricing Module 600 may facilitate adjusting and displaying a new price for a particular product.

In various embodiments, the system begins at Step 610 by displaying, on an electronic display associated with a particular product in a brick-and-mortar retail store, a first price for the particular product. In particular embodiments, the system may be configured to display the first price on any suitable display. In various embodiments, the display may be attached to the particular product. For example, the display may be an electronic tag attached to a product such as a pair of shoes. In particular embodiments, the display may be substantially adjacent to the particular product. In various embodiments, the first price may be any number value and may be in any form of currency. For example, the first price on the display attached to the pair of shoes may be $100. In various embodiments, the display may be a smart electronic display that is operatively coupled to the system via a wired or wireless connection.

At Step 620, the system determines one or more competing prices for the particular product. In various embodiments, the system determines the one or more competing prices by receiving product listings from online retail websites for competitors. The system then determines, based at least in part on one or more matching criteria, which of the product listings are for the particular product. The matching criteria may be a match based on the type of product, the genre of the product, the product's SKU, the brand of the product, or the features of the product, etc. At least partially in response to determining which of the product listings are for the particular product, the system determines the one or more competing prices from the product listings for the particular product. For example, the system may receive product listings for a pair of Nike® Air Max shoes from two online retail websites, Amazon® and Zappos®, where the price on Amazon® is $95 and the price on Zappos® is $105.

In various embodiments, the system may match the model number, size, color, SKU, etc. to the particular product in order to ensure that the one or more competing prices are for a substantially similar product. In still other embodiments, the system may be configured to determine that the one or more competing prices for the particular product are for a similar product, but not for the exact same product. For example, the system may determine that the one or more competing prices are for the same shoe, but for a different color and/or a different size. In various embodiments, even though the competing price is for the same shoe, the system may determine that the competing price does not correspond to the particular product since the competing price is associated with a shoe of a different color (e.g., the competing price is for the same shoe in a more popular color that sells better than the particular product). In other embodiments, the system may compare the SKU associated with the product for the competing price to the SKU for the particular product. In such embodiments, the system may determine that a competing price for a product is a match to the particular product when the SKUs for each product match.

At Step 630, the system is configured to adjust the first price for the particular product to a second price based at least in part on the one or more competing prices for the particular product. For example, in some embodiments, the system may adjust the price for the particular product to match the lowest detected competing price. In other embodiments, the system may adjust the price for the particular product to match the lowest detected competing price among a list of specific competitors. In still other embodiments, the system may adjust the price for the particular product to be one penny lower than the lowest competing price or the lowest competing price among a list of specific competitors. In yet other embodiments, the system may adjust the price for the particular product to match the lowest detected price among competitors located in a specified geographic area. In various embodiments, the second price may be higher than the first price. In particular embodiments, the second price may be lower than the first price. In other embodiments, the second price may be equal to the first price. For example, if the first price for the pair of Nike® Air Max shoes is $100 and the competing prices are $95 at Amazon® and $105 at Zappos®, the system may adjust the first price from $100 to a second price of $95.

In various embodiments, the system may adjust the first price to the second price according to a predetermined schedule. The predetermined schedule may be any suitable schedule including a particular schedule for holidays, a daily schedule, a weekly schedule, a monthly schedule, an hourly schedule, or a schedule by the minute. For example, the system may schedule to adjust the first price to the second price once a week on Fridays based on the one or more competing prices received during that week. In other embodiments, the system may adjust the first price to the second price substantially continuously. For example, once the system adjusts the first price to the second price, the system may then adjust the second price continuously until the product is sold.

At Step 640, the system displays, on the display associated with the particular product in the brick-and-mortar retail store, the second price for the particular product. In various embodiments, the system will substantially automatically display the second price for the particular product. For example, after adjusting the first price from $100 to $95 for the Nike® Air Max shoes, the system will display $95 on the display associated with the shoes, such as an electronic tag attached to the shoes or an electronic tag attached to a shelf on which the shoes are being displayed.

Updating Re-Pricing Module

Figure 7:
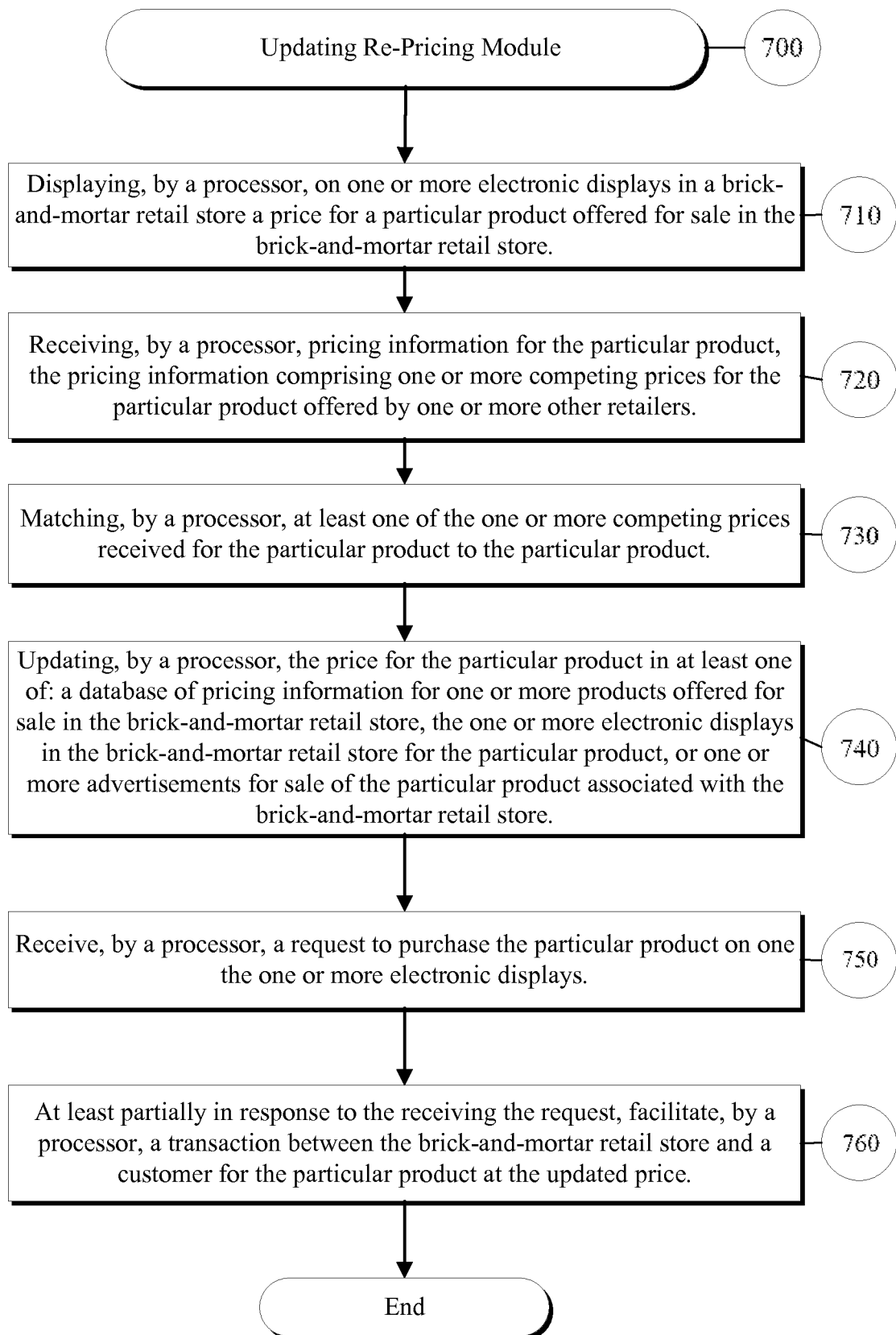
FIG. 7 depicts a flow chart that generally illustrates various steps executed by an updating re-pricing module that, for example, may be executed by the system of FIG. 1.

FIG. 7 is a flow chart of operations performed by an exemplary Updating Re-Pricing Module 700, which may, for example, run on the product pricing server 120, or any other suitable computing device. In particular embodiments, the Updating Re-Pricing Module 700 may adjust a price for a particular product.

Beginning at Step 710, the system displays, by a processor, on one or more electronic displays in a brick-and-mortar retail store, a price for a particular product offered for sale in the brick-and-mortar retail store. In particular embodiments, the system may be configured to display the price on any suitable display. In various embodiments, the display may be attached to the particular product. For example, the one or more displays may be an electronic tag attached to a product such as a pair of shoes. In particular embodiments, the one or more displays may be positioned substantially adjacent to the particular product. In still other embodiments, the one or more displays may be any size, relatively big or relatively small, or any size in between. In various embodiments, the price may be any numeric value and may be in any form of currency. For example, the price on the display attached to the pair of shoes may be $100.

At Step 720, the system receives, by a processor, pricing information for the particular product, the pricing information including one or more competing prices for the particular product. In various embodiments, the pricing information for the particular product is received from the manufacturer of the particular product. In particular embodiments, the pricing information for the particular product is received via the Internet. In various embodiments, the system determines the competing prices by receiving one or more product listings from one or more online retail websites. The system then determines, based at least in part on one or more matching criteria, which of the product listings from the online retail websites are for the particular product. The matching criteria may include, for example, the type of product, the genre of the product, the brand of the product, or one or more product features, a product SKU, etc. In various embodiments, at least partially in response to determining which of the product listings are for the particular product, the system determines the one or more competing prices from the product listings for the particular product. For example, the system may receive product listings for a pair of Nike® Air Max shoes from two online retail websites, Amazon® and Zappos®, where the price on Amazon® is $95 and the price on Zappos® is $105.

Next, at Step 730, the system adjusts, by a processor, the price for the particular product based at least in part on the one or more competing prices. For example, where the competing prices for the particular product priced at $100 are $95 and $105, the system may adjust the price for the particular product higher or lower than the current price depending upon the competing prices. In other embodiments, the system may be configured to adjust the price based on one or more predetermined criteria. For example, in some embodiments, the system may adjust the price for the particular product to match the lowest detected competing price. In other embodiments, the system may adjust the price for the particular product to match the lowest detected competing price among a list of specific competitors. In still other embodiments, the system may adjust the price for the particular product to be one penny lower than the lowest competing price or the lowest competing price among a list of specific competitors. In yet other embodiments, the system may adjust the price for the particular product to match the lowest detected price among competitors located in a specified geographic area. For example, the system may adjust the price for the particular product a plurality of times until the product is sold.

At Step 740, the system updates the price for the particular product, for example, in at least one of the following ways: (1) the system updates a database of pricing information to reflect the change in pricing for one or more products offered for sale in the brick-and-mortar retail store; (2) the system updates the pricing information to reflect the change in pricing on one or more electronic displays in the brick-and-mortar retail store; or (3) the system updates the pricing in one or more advertisements for sale of the particular product associated with the brick-and-mortar retail store to reflect the change in pricing. In particular embodiments, the system may update the price for the particular product substantially automatically. The database of pricing information may contain the updated price as well as one or more the previous prices for the particular product based on the date the price change occurred. The electronic display in the brick-and-mortar retail store may contain the updated price and the previous price in a manner that indicates that the updated price is different than the previous price. For example, the display may contain the updated price in a particular color, such as red, and the previous price shown with a strikethrough, indicating that the updated price is lower than the previous price.

In some embodiments, the system may monitor one or more competitor websites to detect changes in competing pricing for the particular products. In various embodiments, the system may monitor the one or more competitor websites at a particular interval (e.g., hourly, daily, weekly, monthly, substantially continuously, etc.). In some of such embodiments, when a change in a competition price occurs, the system may be configured to update the pricing in a database of pricing information for one or more products offered for sale in the brick-and-mortar retail store. In various embodiments, the system may adjust the price in the database as the changes are detected.

In various embodiments, the system may analyze one or more price patterns for one or more products and project when price changes may occur. In some such embodiments, the system may automatically update the price for a particular product prior to detecting a current price change based on the predicted price change calculated by the system. In this way, the system may provide the brick-and-mortar stores with an advantage of having the lower price for a particular product prior to one or more competitors lowering their prices for the particular product.

Continuing at Step 750, the system receives a request to purchase the particular product at the brick-and-mortar retail store on one of the one or more electronic displays. For example, the system may include a touch screen on the one of the one or more electronic displays for allowing a customer to send a request to purchase the particular product to the store's checkout system. At Step 760, the system, at least partially in response to receiving the request, facilitates, by a processor, a transaction between the brick-and-mortar retail store and a customer for the particular product at the updated price. For example, after receiving the request to purchase the particular product, the system may allow the customer to enter payment information into the one of the one or more electronic displays in order to complete the transaction. In particular embodiments, where the electronic display is attached to the particular product, the system may disengage the electronic display from the particular product enabling the customer to carry the particular product out of the brick-and-mortar retail store. In various embodiments, the touch screen may include a magnetic card reader that would allow the customer to purchase the item. The system may be configured to send an electronic receipt to the customer's e-mail account. In some of these embodiments, the customer, after making the purchase request, may pick the product up at a window where purchased items are delivered in advance of the customer leaving the store.

Factor-Based Re-Pricing Module

Figure 8:
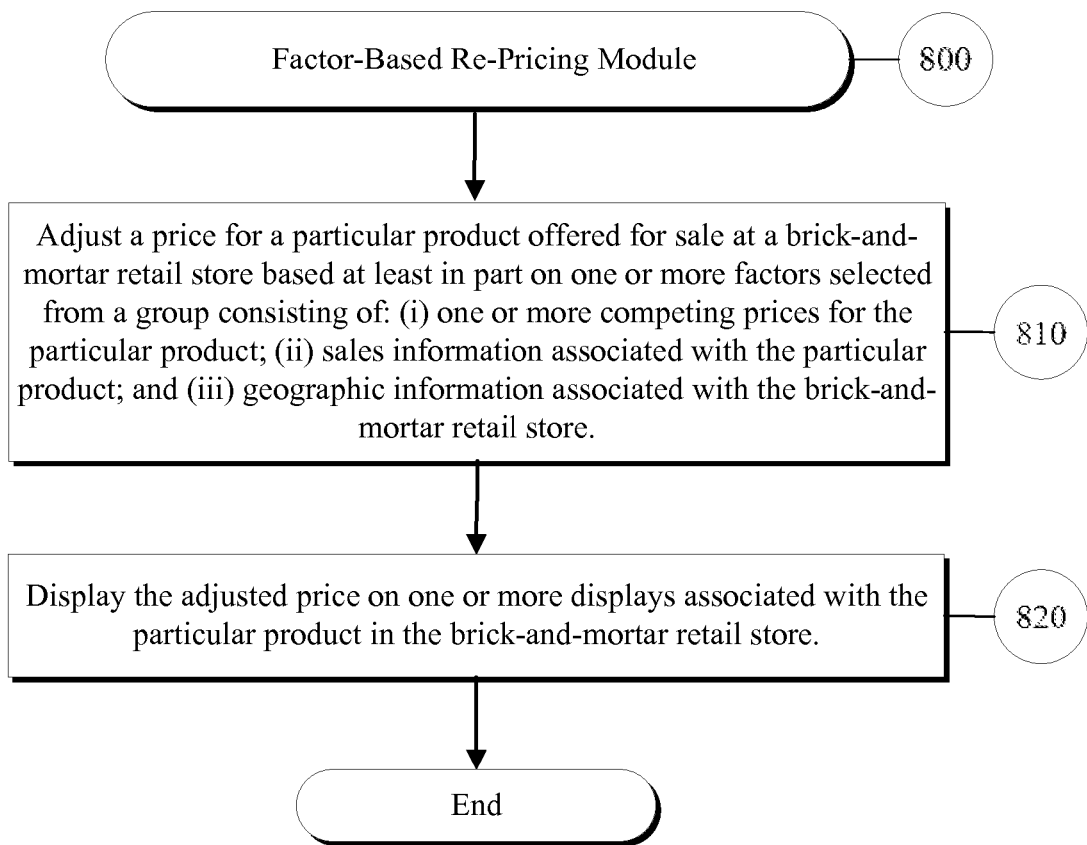
FIG. 8 depicts a flow chart that generally illustrates various steps executed by a factor-based re-pricing module that, for example, may be executed by the system of FIG. 1.

FIG. 8 is a flow chart of operations performed by an exemplary Factor-Based Re-Pricing Module 800, which may, for example, run on the Product Pricing Server 120, or any other suitable computing device. In particular embodiments, the Factor-Based Re-Pricing Module 800 adjusts a price for a particular product based, at least in part, on at least one factor.

At Step 810, the system adjusts a price for a particular product offered for sale at a brick-and-mortar retail store based at least in part on one or more factors selected from a group consisting of: (1) one or more competing prices for the particular product; (2) sales information associated with the particular product; and (3) geographic information associated with the brick-and-mortar retail store. In various embodiments, the one or more competing prices for the particular product may be received from one or more online retailers. That is, the system may be configured to scan one or more online retail outlets for similar products and their associated pricing.

In particular embodiments, the sales information associated with the particular product may be received directly or indirectly from the manufacturer of the particular product. For example, the sales information may contain manufacturer suggested retail price information, regional price information and/or regional or national promotional price information. In various embodiments, the geographic information associated with the brick-and-mortar retail store may be received from one or more geolocation devices such as GPS sensors, which may be used by the system to determine the location of the particular items being sold. In some such embodiments, the GPS sensors may be located in the one or more electronic displays. In various embodiments, the geographic information associated with the brick-and-mortar retail store may be obtained from the Internet or other source, such as from a database of phone numbers or other suitable source. That is, the system may use the brick-and-mortar address to determine the geographical location in which the store resides. The system may then obtain competitive pricing information for one or more products from other retailers located in the same geographical location. This information may be stored in local memory or stored in a central database (e.g., database 140).

At Step 520, the system displays the adjusted price on one or more electronic displays associated with the particular product in the brick-and-mortar retail store. In various embodiments, the system may store computer-executable instructions for displaying the one or more competing prices for the particular product on the one or more electronic displays.

Illustrative Examples

Exemplary Experience of the Automated Access Determination Module

The following describes an exemplary experience of the Automated Access Determination Module 300. In this example, to start, the system begins by determining that a user has accessed a particular web page, for instance, the home page of Amazon.com. The system then gathers information about the user including the user's IP address. In attempting to determine whether the user is an automated user such as a bot, the system prompts the user to complete a CAPTCHA. If the user fails to complete the CAPTCHA, the system blocks the user's access to the web page by blocking access to the IP address of the user.

Exemplary Experience of the Unwanted Human Access Determination Module

The following describes an exemplary experience of the Unwanted Human Access Determination Module 400. To begin, the system detects that a user has accessed a particular web page such as Amazon.com. In this case, the user sets up a user account with Amazon.com, entering information that includes, for example, the user's email address, name, address, phone number, etc. This allows the system to search other websites such as Facebook using the name or email address listed by the user in setting up the user's Amazon.com account. Upon determining from the user's Facebook account that the user is employed by Wal-Mart, the system can flag the user as a potential unwanted human and track the user's activity on Amazon.com to determine whether the user is simply shopping on the website, or if the user is going through product listings more systematically so that it appears the user is mining Amazon.com for product pricing information. If the system determines that the user's search pattern is not reflective of the user simply shopping on the website, the system may determine an appropriate defensive action based on the activity of the user and implement the defensive action against the user.

The system may, for example: (1) receive user information from a user creating an account on a particular e-commerce website; (2) use the user information to access additional information associated with the user (e.g., the user's employer information) from a social media account associated with the user or other publicly available information associated with the user; and (3) determine whether to at least partially limit access to one or more web pages based at least in part on the employer information or other additional information.

Re-Pricing User Experience

The following describes an exemplary user experience associated with the re-pricing of products. In this embodiment, the system displays a first price for a particular product, determines a competing price for the product, adjusts the first price to a second price, and then displays the second price for the product. In a particular example, a manager of a brick-and-mortar retail store may oversee installation of a plurality of electronic displays along each aisle of the brick-and-mortar retail store. The manager may then use the system to associate particular displays with particular products that are placed on the store's shelves. The store manager may then use the system to create one or more pricing rules for the particular products for adjusting a price of the particular products based on competing prices for the particular product. The manager may, for example, provide the system with a pricing rule that the system is to use to reprice the particular products according to a predetermined schedule (e.g., every evening) to match the lowest known competing price for the respective particular product (e.g., as determined via a suitable Internet search).

In this example, the system may, for example, be configured to receive one or more competing prices for the particular product every evening, determine the lowest competing price for the particular products, and adjust (e.g., automatically) the price of the particular products to match the lowest competing price. The system may be configured to display the adjusted price on the electronic displays at the retail store associated with the respective particular products.

Updating Re-Pricing—User Experience

The following describes an exemplary user experience with the updating of pricing. In this embodiment, the system displays a price for a particular product, receives one or more competing prices for the product, adjusts the price for the product based on the competing prices, and updates the price for the product in one or more of the following: a database of pricing information for the products in the brick-and-mortar retail store, one or more display in the brick-and-mortar retail store, or one or more advertisement associated with the brick-and-mortar retail store. For example, the system may have the price for a pair of shoes listed as $100 on the display. After determining that a competitor is selling the same shoes on-line for $90, the system automatically adjusts the price to match the competitor's price. The system then updates the price for the shoes in the brick-and-mortar retail store's advertisements for those shoes such that the next advertisements sent out to the public or presented on a website will include the updated price of $90. The one or more advertisement may be updated, for example, by adjusting the price in advertisements displayed on the retailer's website, or automatically sending updated pricing information to print advertisers (e.g., newspaper advertisers, print flyers, etc.). In this way, the advertising provider can update the listed pricing in print and electronic advertising as the price changes in the retail store.

Factor-Based Re-Pricing User Experience

The following describes an exemplary user experience associated with Factor-Based Re-Pricing. In this embodiment, the system adjusts a price for a particular product offered for sale in a brick-and-mortar retail store based on one or more factors including one or more competing prices, sales information for the product, and geographic information for the store. At least partially based on the one or more factors, the system updates one or more displays, associated with the particular product, with the adjusted price. For example, the system may determine that a brick-and-mortar retail store is located in Georgia by using a geolocation of the brick-and-mortar retail store (e.g., based on the store's address, on a GPS sensor, etc.). Based, at least in part, on the geographic information for the store (i.e., Georgia), the system may determine that a particular product such as a pair of shoes should be sold for a lower price than the same shoes for sale in Texas. Based on the geographic location, the system adjusts the price for the shoes for sale in Georgia and adjusts the price shown on an electronic display associated with the shoes in the brick-and-mortar store in Georgia.

In various embodiments, the system may be configured to track one or more pricing trends for a particular product. The system may use the one or more pricing trends to predict when pricing for the particular product is likely to change (e.g., either go up or go down). In some such embodiments, the system may be configured to predict when a price for a particular product will change and change the particular product pricing prior to the change occurring at competitor retail stores. In this way, the brick-and-mortar store can gain a pricing advantage over other retail stores by offering lower prices prior to their competitors.

Alternate Embodiments

Various embodiments of a system for preventing price-mining and other data-mining may include features in addition to those features described above. Such alternative embodiments are described below.

Blacklisting Particular Sources

In various embodiments, the system is configured to blacklist particular sources of access (e.g., particular users, particular IP addresses, etc.) substantially without having to determine whether the source is an unwanted source. In such embodiments, the system may be configured to: (1) receive a listing of one or more sources to blacklist; and (2) substantially automatically block any attempted access by the one or more sources. In such embodiments, the system may be configured to receive the listing of one or more sources to blacklist from, for example, a company that has hired a third party company to prevent price mining on its web page, or from any other suitable source. In particular embodiments, the system may be adapted to automatically compile the blacklist by searching the Internet and/or other sources for indications that particular individuals are employed, in a potential price mining capacity, by one or more entities, such as competitors of the company, and then adding those particular individuals to the blacklist.

In other embodiments, the system may be configured to create a blacklist by, for example, using publicly available information to determine a list of employees of a particular competitor (e.g., via LinkedIn or another social media website, via the competitor's web page, etc.). In various embodiments, the system is configured to determine a blacklist of one or more individuals based at least in part on particular competitor employee's position with the competitor. For example, the system may be configured to blacklist all IT employees of a particular competitor or blacklist any other suitable employees of a competitor who may be involved (e.g., based at least in part on their position with the competitor) in price mining or other competitive activity.

Public Review and Forum Post Scanning

In various embodiments, the system is configured to scan reviews posted on one or more public web sites as well as posts made on one or more public message boards to determine whether the reviewer or the message board poster may be employed by a competitor or other third party company whose employees may engage in price mining. In such embodiments, the system may be configured to determine that the poster or reviewer is such an individual based at least in part on, for example: (1) content of the post or review; (2) a product or company for which the reviewer has made the review; (3) a topic of the message board; and/or (4) any other suitable factor.

In particular embodiments, the system may determine that a particular poster or reviewer is employed by a particular competitor by, for example, searching a post or review by the particular poster or reviewer for a particular word (e.g., or string of words) which may indicate that the poster or reviewer is employed by the particular competitor. For example, the system may search for instances in a post or review where the poster or reviewer mention an experience while employed by the competitor. In other embodiments, the system is configured to search a plurality of posts or reviews by the same poster or reviewer to ascertain that the poster or reviewer is an employee of the particular competitor. For example, a particular reviewer may post messages to a message board that includes references to their experience as a network administrator. The same reviewer may have posted several reviews for restaurants in Redmond, Wash. The system may, based on this information, determine that the reviewer is an employee of Microsoft, based on their job role and their frequent visits to Microsoft's city of headquarter. In response to determining that a poster or reviewer may be employed by a competitor or other unwanted company, the system may, for example: (1) determine the poster or reviewer's IP address, name, e-mail address; and (2) add that poster or reviewer to a blacklist to block access to that poster or reviewer.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, although various embodiments are described above as being adapted to re-price items in brick-and-mortar retail stores, in other embodiments, the system may be adapted to re-price (e.g., automatically re-price) items that are for sale in an ecommerce context (e.g., by re-pricing one or more items on one or more retail websites). Although specific terms are employed herein, they are used in a generic and descriptive sense only and not for the purposes of limitation.

What is claimed is:

1. A computer system for processing product re-pricing data, the computer system comprising:
 a. at least one processor; and
 b. at least one electronic display operatively coupled to the at least one processor, wherein the computer system is configured for:
  i. displaying, on the at least one electronic display associated with a particular product in a brick-and-mortar store, a first price for the particular product;
  ii. determining, by the at least one processor, one or more competing prices for the particular product offered by one or more competitors of the brick-and-mortar store;
  iii. determining, by the at least one processor, to adjust the first price to a second price based at least in part on criteria comprising:
   a. the one or more competing prices for the particular product offered by the one or more competitors of the brick-and-mortar store;
   b. sales information for sales of the particular product in a particular geographical region; and
   c. a geographical location of the brick-and-mortar store;
  iv. selecting, by the at least one processor, a competing price from the one or more competing prices for the particular product offered by the one or more competitors of the brick-and-mortar store;
  v. adjusting, by the at least one processor, the first price to the second price; and
  vi. displaying, on the at least one electronic display associated with the particular product in the brick-and-mortar store, the second price for the particular product and the selected competing price.

2. The computer system of claim 1, wherein the computer system is further configured for adjusting the first price to the second price according to a predetermined time schedule.

3. The computer system of claim 1, wherein adjusting the price of the particular product further comprises continuously:
 a. monitoring the pricing of the particular product at a website for the one or more competitors; and
 b. updating the price of the particular product in a database of pricing information in accordance with one or more predetermined criteria.

4. The computer system of claim 1, wherein determining the one or more competing prices for the particular product comprises:
 a. receiving a plurality of product listings from a plurality of online retail websites;
 b. determining, based at least in part on one or more matching criteria, which of the plurality of product listings are for the particular product; and
 c. at least partially in response to determining which of the plurality of product listings are for the particular product, selecting the one or more competing prices from the product listing for the particular product.

5. The computer system of claim 1, wherein the computer system is further configured for:
 a. tracking the one or more competing prices over time for the particular product;
 b. determining price change trends for the particular product over time;
 c. predicting price changes for the particular product at least partially based on the determined price change trends; and
 d. adjusting the second price to a predicted price prior to actual changes in competitor pricing.

6. The computer system of claim 1, wherein adjusting the first price to the second price further comprises updating the first price to the second price in a pricing database.

7. The computer system of claim 1, wherein displaying the second price for the particular product further comprises:
 a. wirelessly transmitting the second price to the at least one electronic display; and
 b. at least partially in response to wirelessly transmitting the second price, receiving the second price at the at least one electronic display via a wireless transmitter operatively coupled to the at least one electronic display.

8. A computer-implemented method of processing product re-pricing data and adjusting a price for a particular product displayed on one or more electronic displays that are operatively coupled to a system that monitors prices for products sold in a brick-and-mortar retail store, the method comprising:
 a. displaying, by one or more processors, on the one or more electronic displays in the brick-and-mortar retail store the price for the particular product offered for sale in the brick-and-mortar retail store;
 b. receiving, by the one or more processors, pricing information for the particular product, the pricing information comprising one or more competing prices for the particular product offered by one or more other retailers;
 c. matching, by the one or more processors, at least one of the one or more competing prices received for the particular product to the particular product;
 d. determining, by the one or more processors, to update the price for the particular product based at least in part on criteria comprising:
  (i) the one or more competing prices for the particular product offered by the one or more other retailers;
  (ii) sales information for sales of the particular product in a particular geographical region; and
  (iii) a geographical location of the brick-and-mortar retail store;
 e. selecting, by the one or more processors, a competing price from the one or more competing prices for the particular product offered by the one or more other retailers;
 f. updating, by the one or more processors, the price for the particular product in at least one of:
  (i) a database of pricing information for one or more products offered for sale in the brick-and-mortar retail store;

(ii) the one or more electronic displays in the brick-and-mortar retail store for the particular product; or (iii) one or more advertisements for sale of the particular product associated with the brick-and-mortar retail store; and g. displaying, on the one or more electronic displays in the brick-and-mortar retail store for the particular product, the selected competing price.

9. The computer-implemented method of claim 8, further comprising automatically updating, by the one or more processors, the price for the particular product on the one or more electronic displays based, at least in part, on the matched at least one of the one or more competing prices.

10. The computer-implemented method of claim 8, wherein updating the price of the particular product further comprises continuously:

a. monitoring, by the one or more processors, the pricing of the particular product at one or more competing retailers' website; and b. updating, by the one or more processors, the price of the particular product in the database of pricing information in accordance with one or more predetermined criteria.

11. The computer-implemented method of claim 8, wherein matching at least one of the one or more competing prices received for the particular product to the particular product further comprises:

a. comparing, by the one or more processors, at least one attribute selected from a group consisting of (i) a model number of the competing product, (ii) a size of the competing product, (iii) a color of the competing product, (iv) a style of the competing product, (v) a genre of the competing product, (vi) a brand of the competing product, (vii) a geographic location of the competing product, and (viii) stock-keeping unit (SKU) number of the competing product to at least one similar attribute of the particular product; and b. selecting, by the one or more processors, at least one product associated with the respective one or more competing prices that best matches the at least one similar attribute of the particular product.

12. The computer-implemented method of claim 8, further comprising the steps of:

a. tracking, by the one or more processors, competing prices over time for the particular product;

b. determining, by the one or more processors, one or more price change trends for the particular product over time;

c. predicting, by the one or more processors, one or more price changes for the particular product at least partially based on the determined one or more price change trends; and d. adjusting, by the one or more processors, the updated price on the or more electronic displays to a predicted price prior to an actual change in competitor pricing.

13. The computer-implemented method of claim 8, further comprising the step of automatically updating, by the one or more processors, the one or more electronic displays in the brick-and-mortar retail store for the particular product based on the received one or more competing prices for the particular product until the particular product is sold.

14. The computer-implemented method of claim 8, wherein updating the price for the particular product on the one or more electronic displays further comprises displaying, by the one or more processors, both the updated price and the price on the one or more electronic displays.

15. A computer system for processing product re-pricing data, the computer system comprising at least one processor, wherein the computer system is configured for:

a. displaying, on at least one electronic display associated with a particular product in a brick-and-mortar store, a first price for the particular product;

b. determining, by at least one processor, one or more competing prices for the particular product offered by one or more competitors of the brick-and-mortar store;

c. adjusting, by the at least one processor, the first price to a second price based at least in part on criteria comprising:

i. the one or more competing prices for the particular product offered by the one or more competitors of the brick-and-mortar store;

ii. sales information for sales of the particular product in a particular geographical region; and iii. a geographical location of the brick-and-mortar store; and d. displaying, on the at least one electronic display associated with the particular product in the brick-and-mortar store, the second price for the particular product and a competing price for the particular product selected from the one or more competing prices for the particular product offered by the one or more competitors of the brick-and-mortar store.

16. The computer system of claim 15, wherein the computer system is further configured for adjusting the first price to the second price automatically.

17. The computer system of claim 15, wherein determining the one or more competing prices for the particular product comprises:

a. receiving a plurality of product listings from a plurality of online retail websites;

b. determining, based at least in part on one or more matching criteria, which of the received plurality of product listings are relevant to the particular product; and c. at least partially in response to determining which of the plurality of product listings are relevant to the particular product, selecting the one or more competing prices for the particular product.

18. The computer system of claim 15, wherein adjusting the first price of the particular product to the second price further comprises updating the first price to the second price in a pricing database.

19. The computer system of claim 18, wherein adjusting the first price of the particular product to the second price further comprises:

a. continuously monitoring the price of the particular product at one or more competing retailers; and b. updating the price of the particular product in the database of pricing information in accordance with one or more predetermined criteria.

20. The computer system of claim 15, wherein the computer system is further configured for:

a. tracking one or more competing prices over time for the particular product;

b. determining a price change trend for the particular product;

c. predicting a price change for the particular product at least partially based on the determined price change trend; and d. calculating the second price based on the predicted price change.

* * * * *